Figure 1:
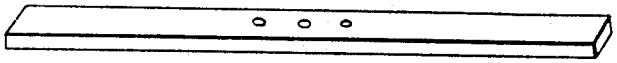
Figure 2:
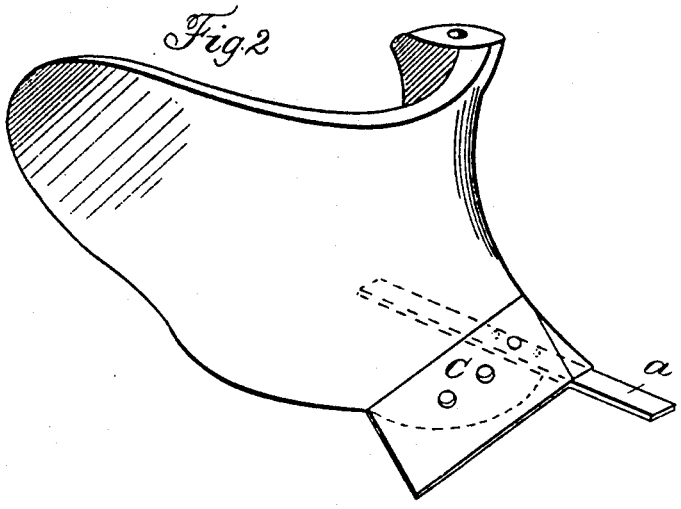
Figure 3:
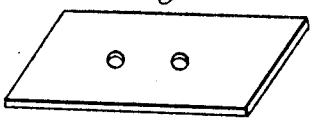

3869X

R. WINANS.

Plow.

Patented May 11, 1824.

N. PETERS, PHOTO-LITHOGRAPHER, WASHINGTON, D. C.